United States Patent [19]

Rine

[11] Patent Number: 4,841,623

[45] Date of Patent: Jun. 27, 1989

[54] METHOD OF MOUNTING STONES IN DISC OR ATTRITION MILLS

[76] Inventor: James C. Rine, 1016 Lake Montgomery Dr., Lake City, Fla. 32055

[21] Appl. No.: 676

[22] Filed: Jan. 6, 1987

Related U.S. Application Data

[63] Continuation-in-part of Ser. No. 689,147, Jan. 7, 1985, abandoned.

[51] Int. Cl.[4] .................. B23P 19/04

[52] U.S. Cl. .................. 29/525.1; 241/261.2; 241/298

[58] Field of Search .................. 29/526 R, 597; 51/206 R, 209 R, 168; 241/DIG. 30, DIG. 31, 21, 296, 297, 298, 30, 37, 261.2, 261.3, 60

[56] References Cited

U.S. PATENT DOCUMENTS

| | | | |
|---|---|---|---|
| 660,699 | 10/1900 | Foley | 241/296 X |
| 2,343,757 | 3/1944 | Egedal | 241/60 X |
| 2,823,496 | 2/1958 | Winter | 51/209 R X |
| 2,833,483 | 5/1958 | China | 241/37 |
| 3,009,659 | 11/1961 | Jones | 241/DIG. 30 |
| 3,326,480 | 6/1967 | Jones | 241/298 |
| 4,274,602 | 6/1981 | Johansson | 241/298 |
| 4,535,941 | 8/1985 | Brubaker et al. | 241/21 |

FOREIGN PATENT DOCUMENTS

| | | | |
|---|---|---|---|
| 580330 | 9/1946 | United Kingdom | 51/209 R |

*Primary Examiner*—Mark Rosenbaum
*Attorney, Agent, or Firm*—John P. Sutton, Inc.

[57] ABSTRACT

This invention provides a mounting method for abrasive grinding wheels in disc or attrition mills operated at high speeds. Stone grinding discs are placed under a compressive load at mounting sufficient to counter tension loads during use. The compression loading is preferably provided by taper elements incorporating the wheel itself or by elements other than the wheel, such as fluid actuated clamps and elements external to the wheel that induce compression.

5 Claims, 2 Drawing Sheets

METHOD OF MOUNTING STONES IN DISC OR ATTRITION MILLS

This application is a continuation-in-part of copending application Ser. No. 689,147 filed Jan. 7, 1985, now abandoned.

This invention relates to abrasive wheels. More particularly, this invention relates to a mounting method for abrasive grinding wheels in disc or attrition type mills and other high speed service.

The disc or attrition mill is a modern counterpart of the early buhrstone mill. Stones have been replaced by steel discs that can be rotated at higher speeds, thus permitting a much broader range of application. The operational speed for stones has heretofore been limited because their strength was too low to withstand the loads from centrifugal and thermal stress. For many applications like size reduction of organic materials such as rubber, plastics or wood pulp, stones are superior to metal discs if operated at high speeds. The object of this invention is to provide a method for operating disc or attrition mills at high speeds when fitted with either bonded or vitrified abrasive wheels.

BACKGROUND OF THE INVENTION

In the past, grinding wheels have been held in place upon the supporting member by pouring molten sulfur, lead or other suitable material between a turned in flange and the wheel itself. The wheel is slightly enlarged in diameter at its supporting position so the molten material will hold it more firmly in place and prevent it from being accidentally withdrawn. This method is disclosed in U.S. Pat. No. 1,814,587.

Another method of holding the abrasive member to a plate is by means of a layer of specially processed material, usually rubber, which acts as a cushion to relieve grinding strains and shock. Additionally, where heavy stress and torque loads are encountered, wire and other suitable binding is placed on the outside diameter. This method is also used on soft grade, low strength wheels.

There are many well-known methods for producing particulate materials of varying particle size. Typical of these methods are simple mechanical choppers such as the Cumberland chopper. However, the Cumberland chopper is limited to production of comparatively high particle sizes and maintenance costs are high. Another industry practice is the use of cryogenic grinding involving liquid nitrogen or carbon dioxide and mechanical means for size reduction of the cold brittle particles. This method, while technically feasible, has generally been found too costly for general purpose size reduction. Another practice is the use of two roll grinders. In this system, material to be reduced in size is fed between the nip of two metal rolls having serrated surfaces. Particles fed to the roll mills are reduced in size by the stretching and tearing action imparted by the rolls. After passing through the rolls, the resulting particles are screened to desired Particle size but particle sizes are typically limited to 40–50 mesh.

Still another method that has been utilized is that of wet grinding such as disclosed in U.S. Pat. No. 4,049,588. In this patent, vulcanized rubber is converted into finely divided particles by pre-swelling the rubber, with a swelling fluid, forming a dispersion of the swollen particles and then comminuting the dispersed, swollen particles. U.S. Pat. No. 4,046,834 describes a wet grinding method in which an aqueous mixture of rubber particles is passed between two discs, one of which is rotating and the other stationary.

While aqueous grinding of particles between two grinding discs produces finely ground particles, this method has had the disadvantage of low production rates because stones of sufficient diameter to permit efficient production have not had sufficient strength to withstand stresses incurred at high speeds. The weakness of molded stone grinding wheels is suggested in U.S. Pat. No. 3,615,304 of which I am co-inventor. This patent discloses a method for preventing stone grinding discs from disintegrating which comprises the use of a fiberglass and resin band around the circumference of the wheel.

Accordingly, it is an object of this invention to provide a method for mounting bonded abrasive grinding discs on a high speed grinding mill.

Another object of this invention is to provide a mounting method for grinding discs that cannot be conveniently placed over the end of a rotating shaft. This aspect of my invention permits the grinding discs to be sectioned into two or more pieces before mounting.

Still another object of this invention is to provide a means for comminuting vulcanized rubber, plastics or other organic materials with stone grinding discs operating at high speeds. Other objects of this invention will become apparent to those skilled in the art after consideration of the following more detailed disclosure.

SUMMARY OF THE INVENTION

It has been found that the foregoing objectives can be accomplished by using a taper similar to those commonly used in the machine tool industry. A suitable taper can be one of two types depending on the application. A self holding taper is defined as "a taper with an angle small enough to hold in place ordinarily by friction without holding means. (Sometimes referred to as a slow taper.)" A steep taper is defined as "a taper having an angle sufficiently large to ensure the easy or self releasing feature." As disclosed above, the use of tapers is a well-known industry practice. Their use and description is disclosed in Machinery's Handbook, 19th edition, pages 1678–1692. The taper may be an integral part in which case the separate part mates the straight wheel outer diameter and carries the appropriate taper on the outside diameter. The machine tool industry uses these tool elements on certain types of small tools and machine parts, such as twist drills, arbors, lathe centers, etc., to fit into spindles or sockets of corresponding taper, thus providing not only accurate alignment between the tool or other part and its supporting member, but also more or less frictional resistance for driving the tool. Both elements of the taper are usually small and made of metal in the case of the machine tool industry without regard for placing the male member in compression other than for frictional resistance.

For grinding wheels, which can resist high compression loads but very low tension loads, this compression feature of the taper makes it possible to pre-stress the wheel using the outer female element of the taper made of metal which has a high modulus in comparison with the wheel itself. The compression load placed on the wheel by the taper is balanced against any tension stresses in use by the female element and the wheel need not be an integral element but may be made of two or more sections. In contrast to this mounting method, is the usual method of a central arbor hole on a spindle.

The arbor shaft is usually threaded to carry a nut for clamping a pair of flanges against the sides to drive the wheel.

In a preferred embodiment of my invention, the mounting means is comprised of a tapered steel ring straight cut on the inside diameter and matching the outside diameter of the stone. The ring is tapered three and one-half inches per foot on the outside diameter. The thickness of the ring varies with the thickness of the stone and in all areas the taper is from the top edges. The ring is cut in half across the diameter and one-quarter inch cut from each end. In association with the two split rings, is a third ring with the inside cut to the same taper as the split rings. The ring is provided with recessed mounting bolts and, when mounted over the split rings and bolted to the stationary or rotary mounting plate, compresses the split rings against the grinding disc and puts the stone under compression. This allows the stones to be driven from the outside. Thus, the compression load placed on the wheels by the taper is balanced against tension stresses generated by centrifugal force of the rotating wheels.

DETAILED DESCRIPTION OF DRAWINGS

Figure 1:
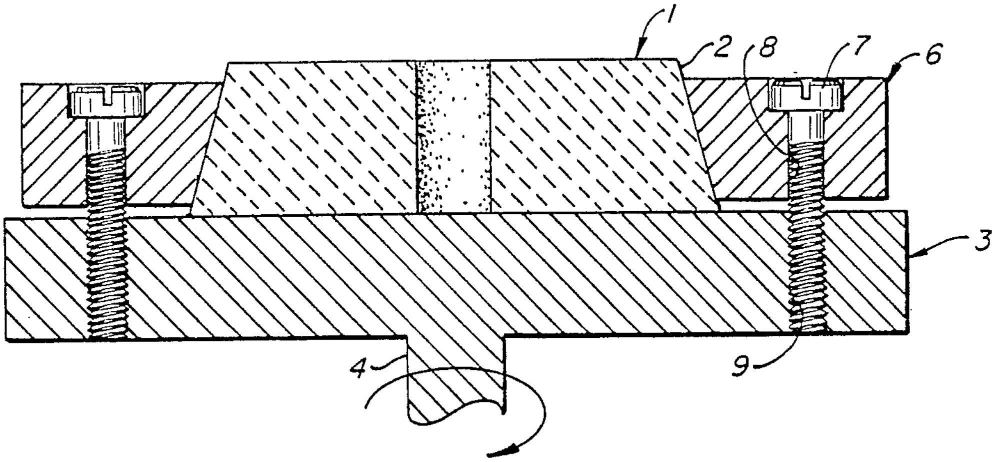
FIG. 1 is a cross-sectional view of a wheel mounted with a taper on the wheel.

FIG. 1 is an illustration of a tapered grinding wheel. A conventional grinding stone 1 is tapered on its outer periphery 2 according to the present invention. The stone is placed on a drive table 3 which rotates about shaft 4. The stone 1 is mounted on table 3 by means of a holding ring 6 which has been cut to accommodate the taper on wheel 2. Ring 6 is mounted on drive table 3 by means of a threaded screw 7 which passes through an opening 8 in ring 6 and is threaded into a corresponding opening 9 in drive table 3. A suitable number of mounting screws 7 may be placed around ring 6 to tightly secure wheel 1 to table 3. In operation, wheel 1 has a counterpart bearing a similar taper above the one shown separated by a suitable distance to allow the grinding action to take place. The upper stone is similarly affixed to a non-rotating mount so that the grinding action takes place between the lower rotating wheel and the upper fixed wheel.

Figure 2:
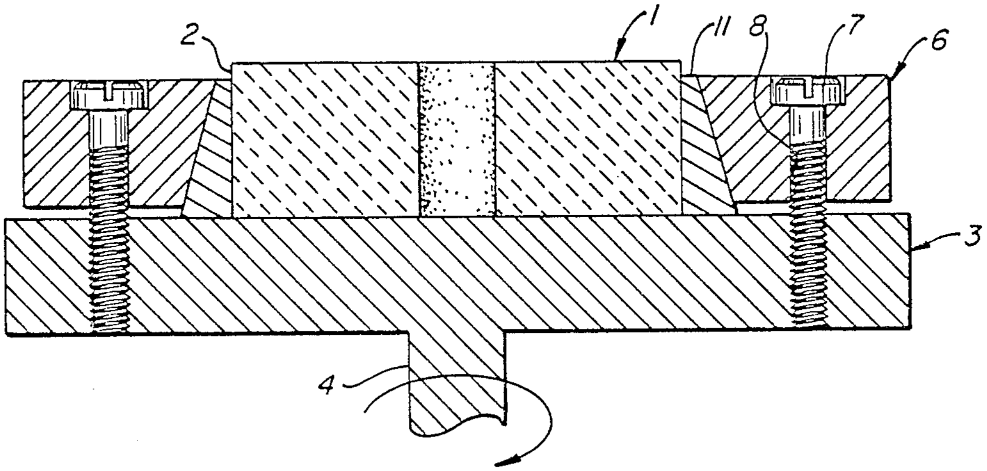
FIG. 2 is cross sectional view of a wheel mounted with the taper elements separate from the wheel.

An alternative embodiment is illustrated in FIG. 2, wherein a conventional wheel 1 does not have a taper but is in the normal cylindrical configuration. As in FIG. 1, the stone in FIG. 2 is mounted on a drive table 3 by means of holding ring 6 through which are threaded a series of screws 7 attaching the holding ring to the drive table. However, in FIG. 2, there is an additional split ring 11 which provides the taper for engaging the holding ring 6. Ring 11 is a ring of brass, stainless steel or suitable material which encircles stone 1. The inside circumference of ring 11 is slightly smaller than the outside circumference of wheel 1. There is a split in the circumference of ring 11 to allow a gap of approximately ⅛ inch to facilitate the encirclement of ring 11 around stone 1. When the stone 1 and ring 11 are placed on table 3, holding ring 6 may be tightened down to narrow the gap in the split of ring 11 and securely hold stone 1 against table 3.

The purpose of holding ring 6 in both the embodiment of FIG. 1 and FIG. 2 is to prestress the stone in an even manner so that tension forces are evenly applied throughout the periphery of the stone. The prestress applied by holding ring 6 to stone 1 gives the stone the capability of counteracting the centrifugal forces in operation.

Figure 3:
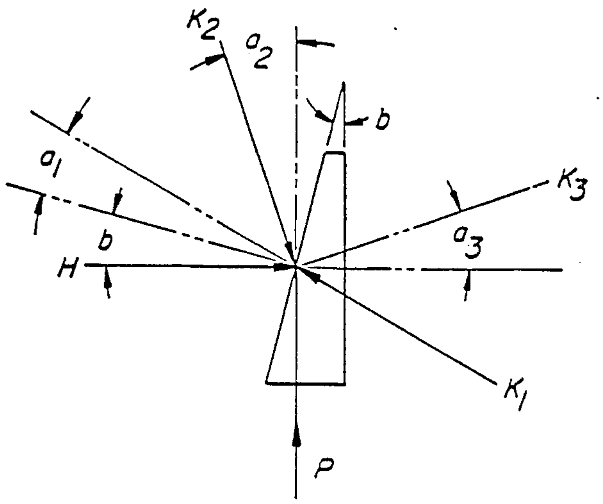
FIG. 3 is a diagrammatic view of the forces and supporting reactions on the taper.

FIG. 3 is a diagrammatic illustration of the forces and reactions on the taper of the wheel of FIG. 1 or the ring 11 of FIG. 2. The figure shows the forces which act upon the taper in accordance with the following formula:

$$P = H\frac{\text{Cos } a_2 \text{ Sin } (b + a_1 + a_3)}{\text{Cos } a_3 \text{ Cos } (b + a_1 + a_2)}$$

Figure 4:
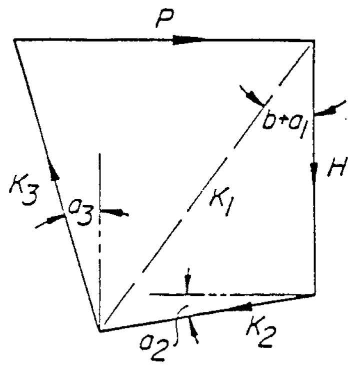
FIG. 4 is a force polygon used to solve for the supporting reactions and forces on the taper.

The required force P to move the taper in the direction of P and overcome force H may be determined by using the force polygon shown in FIG. 4. The friction angles of the three faces of the triangle are $a_1$, $a_2$, and $a_3$. The supporting reactions $K_1$, $K_2$ and $K_3$ may also be determined from the force polygon of FIG. 4.

In order for the taper to be a slow or non-releasing one, the value of b should be greater than the value of the sum of $a_1$ and $a_3$. Stated in another way, the value of b should be more than twice the value of a. In order for the taper to be self-releasing, then the value of b should be less than the value of $2a$ or the value of $a_1+a_3$.

It is also within the scope of my invention to use external elements and hydraulic or pneumatic clamping means to apply a compressive load to the grinding discs.

Figure 5:
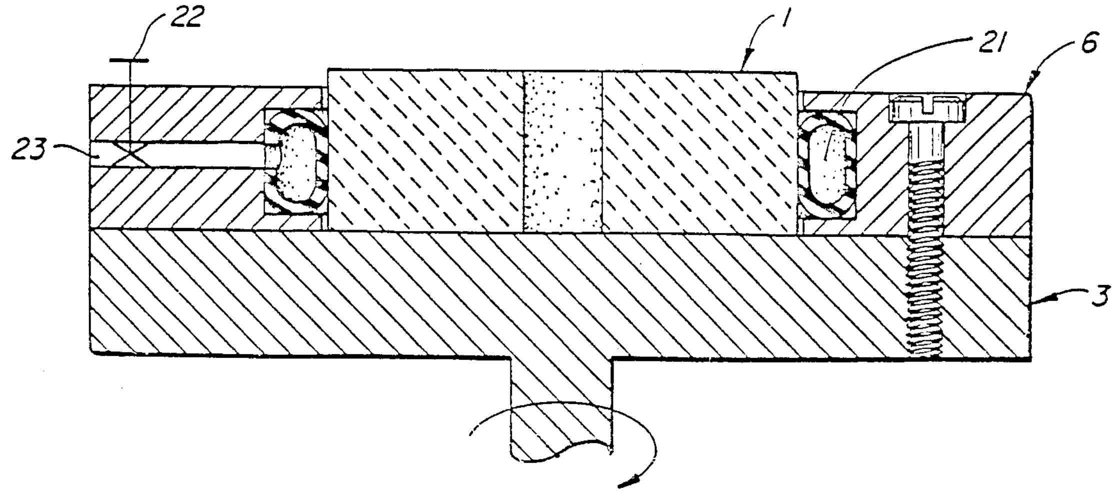
FIG. 5 is a cross-sectional view of a wheel mounted with fluid clamping to induce compressive stress.

FIG. 5 illustrates one type of fluid actuated clamp used to induce compression at the circumference of the abrasive grinding wheel during mounting and in use. As in FIG. 2, a conventional wheel 1 is mounted on a drive table 3 by means of a clamping ring 6 attached to the table. However, in FIG. 5, the clamping ring retains a fluid expandable tube 21 connected through a valve 22 which may in turn be connected at 23 to a suitable source of pressure to expand the tube, encircling the circumference of the stone, against the clamping ring. The purpose of the clamping ring is to prestress the stones in an even manner as in the embodiments of FIG. 1 and FIG. 2. Once the desired prestress load is attained, by application of pressure, the valve is closed to retain the prestress during use which gives the capability of counteracting the centrifugal forces in operation as previously illustrated.

Size and speed can vary widely in the method of this invention. For example, the grinding wheels may typically range in size from six inches in diameter to 36 inches. The female member of the elements should be designed to withstand the centrifugal and other stresses generated at operating conditions.

The method of this invention can be used on compositions of low tensile strength, e.g., soft grade wheels allowing this to be used at high speeds. By making the compressive strength the limiting factor, the useful operating speed can be at an optimum. The optimum speed will vary with the diameter of the grinding discs but typical speeds will range from 1200–3600 RPM.

Speed of rotation does not give an accurate measure of the grinding ability of the wheel. The more acceptable measure is the surface feet per minute. This more accurately describes the linear distance around the periphery of the wheel and takes into account the diameter of the wheel, whereas revolutions per minute does not.

In the present invention, improved results may be obtained when the surface speed is above 4,000 surface feet per minute. Optimum results are obtained when the speed is between 6,000 SFPM and 24,000 SFPM.

The stress that must be placed on the wheel must be sufficient to counter the centrifugal force exerted on the wheel during use. The magnitude of the pre-stress depends upon the strength of the wheel. All grinding wheels have far greater compressive strength than tensile strength, whether soft wheels or hard wheels. Soft wheels have a compressive strength generally in the range of 4,000 psi to 10,000 psi. Hard wheels have a compressive strength between 10,000 psi and 20,000 psi. Tensile strength in such grinding wheels is difficult to measure. Vitrified materials often have a tensile strength in the hundreds of psi, and they crack and break easily.

According to the present invention, a load in excess of the tensile strength is placed on the stone on an inwardly radial direction to counter the tension load of centrifugal force during use. The pre-stress obviously must be less than the compressive strength of the stone to avoid crushing it. However, the lowest compressive strength of any vitrified stone is 3,000 psi. Accordingly, a pre-stress of 1,000 psi minimum will assuredly exceed the tensile strength but be less than the compressive strength. In practice, the pre-stress generally is between 4,000 psi and 20,000 psi for most stones, depending on hardness.

The throughput of ground product that results from the present invention is a function of the wheel diameter. The stone wheels presently in use have a six inch diameter and generate about 65 pounds of ground product per hour. By the method of my invention, I have found that using a wheel large enough to produce 350 pounds of product per hour are possible. Steel wheels, used in the past for grinding on large diameter wheels, are not hard enough to effectively comminute large volumes. Consequently, steel wheels wear excessively.

The throughput of the process is also a function of the speed of rotation of the wheel. While steel wheels in the past could be rotated at 3600 RPM, stone wheels would break apart by centrifugal force at that speed. I prefer a rotation of 3600 RPM for optimum production, but no precise speeds are required. The rotation rate chosen depends on the material being ground, the particle size desired, the incoming material size and composition, etc. The stress on the wheel is squared with the doubling of either the diameter of the wheel or speed of rotation.

The size reduction elements used are comprised of two adjustably spaced grinding stones, one in a fixed position and the other rotating. The stones are typically comprised of vitrified silicon carbide. The grit size of the stones can vary from 16 to 120 depending on the fineness desired in the finished product. In order to transport material from the center of the stones to the outer periphery, furrows are required. The furrows may be cut tangentially or radially from the stone center. The number of furrows in the stone will vary depending on the diameter of the stone. In a seven inch diameter stone, for example, six furrows are adequate to produce - 100 mesh rubber at a rate of 50 lbs. per hour. On larger diameter stones, one may use from 8 to 24 furrows. The depth of the furrows can vary from $\frac{1}{8}''$ to $\frac{1}{4}''$ and the width from $\frac{1}{8}''$ to $\frac{1}{2}''$.

The method of this invention can be used to comminute wood pulp, plastic resins such as polyethylene, polypropylene, polyethylene and polybutylene terephthalates, polycarbonates, Teflon and vulcanized rubber.

Comminuting rubber or plastics in the method of this invention generates large amounts of heat. In order to cool and lubricate the stones during grinding, a lubricant is required. Water is an excellent fluid for this purpose and also serves as a carrier for transporting the particles to be carried into the grinding discs. The amount of water required is a function of mill size and throughput. While water is a preferred lubricant and carrier medium, other fluids may also be used such as high boiling organic fluids.

The invention is illustrated by the following nonlimiting specific examples:

EXAMPLE I

A standard Morehouse colloid mill (Model B1400) was used for this test. The size reduction elements of this mill consist of two adjustably spaced grinding stones, one in a fixed position and one rotated at 3600 RPM. Stone mounting for the rotating member is the usual threaded spindle nut arrangement. This rotating stone was removed and a $1\frac{1}{2}''$ per foot taper cut on the outer diameter (the smaller diameter at the top) by standard methods used in the industry in the manner illustrated in FIG. 1. A 7" diameter steel ring with a matching taper ($1\frac{1}{2}''$ per foot) on the inner diameter was machined. The metal ring was placed over the wheel and attached to the platen by screws, tapping down the metal ring as the screws were tightened to seat the taper in compression on the wheel. The stones were adjusted to a tight setting and fed a coarse grain pigment. The effluent from the mill had a very smooth consistency equivalent to that obtained by normal mounting as would be expected.

EXAMPLE II

The same equipment and procedure described in Example I was repeated except the rotating stone was broken on a diameter into two segments before mounting. Again the mill effluent was examined and found to have the same smooth consistency obtained when using an unbroken stone because the taper compressed the stone to close any crack that would otherwise exist.

EXAMPLE III

A standard 12" laboratory refiner attrition mill manufactured by Sprout, Waldron & Co., Inc. was operated at various speeds up to 3600 RPM. This mill is very similar to the mill described in Example I except the standard size reduction elements are metal plates bolted in place to form both the fixed and rotating discs that are capable of withstanding the higher centrifugal forces which are over four times that in Example I according to the following two laws of physics: (1) For a given diameter, the stresses are proportional to the square of the speed. (2) For a given speed, the stresses are proportional to the square of the diameter, e.g., at the 3600 RPM. the 12" diameter is two times the 6" diameter resulting in four times the stress. While operating this mill on mechanical wood pulp, three passes through were required at the tightest setting to remove mats of fibers in the pulp.

The bolted plates were removed from this mill and replaced with abrasive wheels 12" in diameter. Both fixed and rotating stones were dressed on the outer diameter with a 3" per foot taper for mounting with a 14" diameter steel ring carrying the female portion of the matching taper. The same mounting method used in Example I to place the wheels in compression was followed. At the tightest setting, pulp, free of mats of fibers, was obtained by one pass through the mill.

EXAMPLE IV

Again, the rotating stone was broken on a diameter into two segments before mounting. The product was equal to that produced by the integral wheel described in Example III.

EXAMPLE V

The metal plates were removed from a model 36-2 production size mill of the same manufacturer and configuration as described in Example III. The outside diameter of two 24" wheels were dressed perpendicular to the sides. As shown in FIG. 2, a separate metal part 11 with a 3½" taper per foot on the outer diameter and matching the wheel outside diameter was placed between a 26" diameter steel ring carrying the female portion of the taper and the wheel. This assembly was mounted as described in Example I. The rotor carrying the 24" wheel at 3600 RPM according to the laws of physics stated in Example III. Clean pulp was produced at production rates with one pass compared with three required for the metal plates just as the case using the laboratory refiner.

EXAMPLE VI

As in Examples II and IV, the rotating wheel was broken on a diameter into two segments before mounting One pass on pulp was equivalent to the integral wheel described in Example V.

EXAMPLE VII

An 8" attrition mill manufactured by Bauer Brothers, Model 148-2 was equipped with 7" stone grinding discs in a manner similar to that described in Example I and illustrated in FIG. 1. This mill was powered by a 30 H.P. motor turning at 3600 RPM.

The stones were adjusted to a tight setting and fed 10 mesh whole tire stock at a rate of 40 lbs. per hour. Water was fed to the mill at a rate of 0.5 gallons per minute. The effluent was a thick, creamy paste having a particle size of −100 mesh.

It will be apparent to those skilled in the art that other equivalent means to those described above may be used according to the invention of the claims.

I claim:

1. A method of mounting abrasive wheels or wheel segments on a drive table for operation at surface speeds in excess of 4,000 surface feet per minute the improvement comprising prestressing the wheels or wheel segments applying an inwardly directed radial compressive force on the wheel greater than 1,000 psi to counter tension loads during use.

2. A method according to claim 1 wherein the compressive load exceeds 3,000 psi.

3. A method according to claim 1 wherein the compression loading is by taper elements incorporating the wheel itself.

4. A method according to claim 1 wherein the compression loading is by taper element other than the wheel.

5. A method according the claim 1 wherein the compression loading is by hydraulic or pneumatic clamping.

* * * * *